(12) United States Patent
Longo et al.

(10) Patent No.: US 11,808,296 B2
(45) Date of Patent: Nov. 7, 2023

(54) SYSTEM AND METHOD FOR FASTENING AND LOCATING ONE VEHICLE COMPONENT RELATIVE TO ANOTHER VEHICLE COMPONENT WITHOUT USING MECHANICAL FASTENERS

(71) Applicant: GM GLOBAL TECHNOLOGY OPERATIONS LLC, Detroit, MI (US)

(72) Inventors: Michael J. Longo, Rochester Hills, MI (US); Dennis L. Arnold, Davison, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 587 days.

(21) Appl. No.: 17/085,684

(22) Filed: Oct. 30, 2020

(65) Prior Publication Data
US 2022/0136539 A1 May 5, 2022

(51) Int. Cl.
*B60R 7/06* (2006.01)
*F16B 5/00* (2006.01)

(52) U.S. Cl.
CPC .............. *F16B 5/0052* (2013.01); *B60R 7/06* (2013.01)

(58) Field of Classification Search
CPC .......... F16B 5/0052; F16B 4/004; B60R 7/06; B60R 13/0275; B60R 2013/0293; B60R 13/0206; B60R 13/0256; B60K 37/04

USPC ......................................................... 296/37.1
See application file for complete search history.

(56) References Cited

U.S. PATENT DOCUMENTS

| | | | |
|---|---|---|---|
| 6,718,599 B2 * | 4/2004 | Dickinson | F16B 21/075 24/295 |
| 7,086,125 B2 * | 8/2006 | Slobodecki | B60R 13/0206 24/295 |
| 10,017,134 B2 * | 7/2018 | Pickens | F16B 5/06 |
| 10,450,018 B2 * | 10/2019 | Carroll | B60Q 1/045 |

* cited by examiner

*Primary Examiner* — Pinel E Romain

(57) ABSTRACT

A system includes a first vehicle component and a second vehicle component. The first vehicle component includes a first panel, a T-shaped projection protruding from a mating surface of the first panel, and a locking projection protruding from the mating surface of the first panel. The second vehicle component includes a second panel and a pair of ramped ribs projecting from a non-mating surface of the second panel. The second panel defines a slot that extends through the non-mating surface thereof. The slot includes a first portion having a first width and a second portion having a second width that is less than the first width. The ramped ribs are disposed on opposite sides of the second portion of the slot. The first vehicle component is configured to be fastened to the second vehicle component and located relative to the second vehicle component.

20 Claims, 6 Drawing Sheets

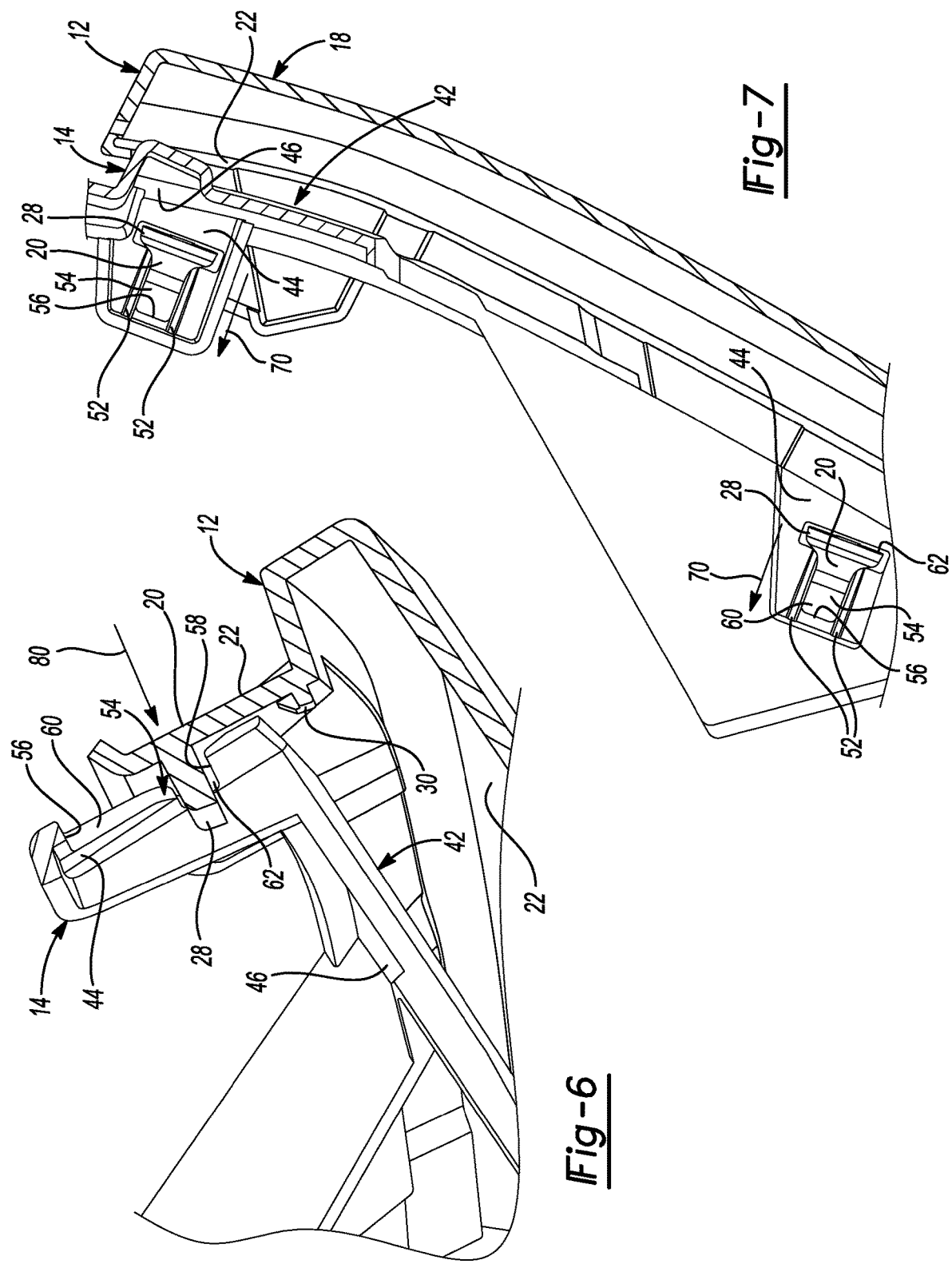

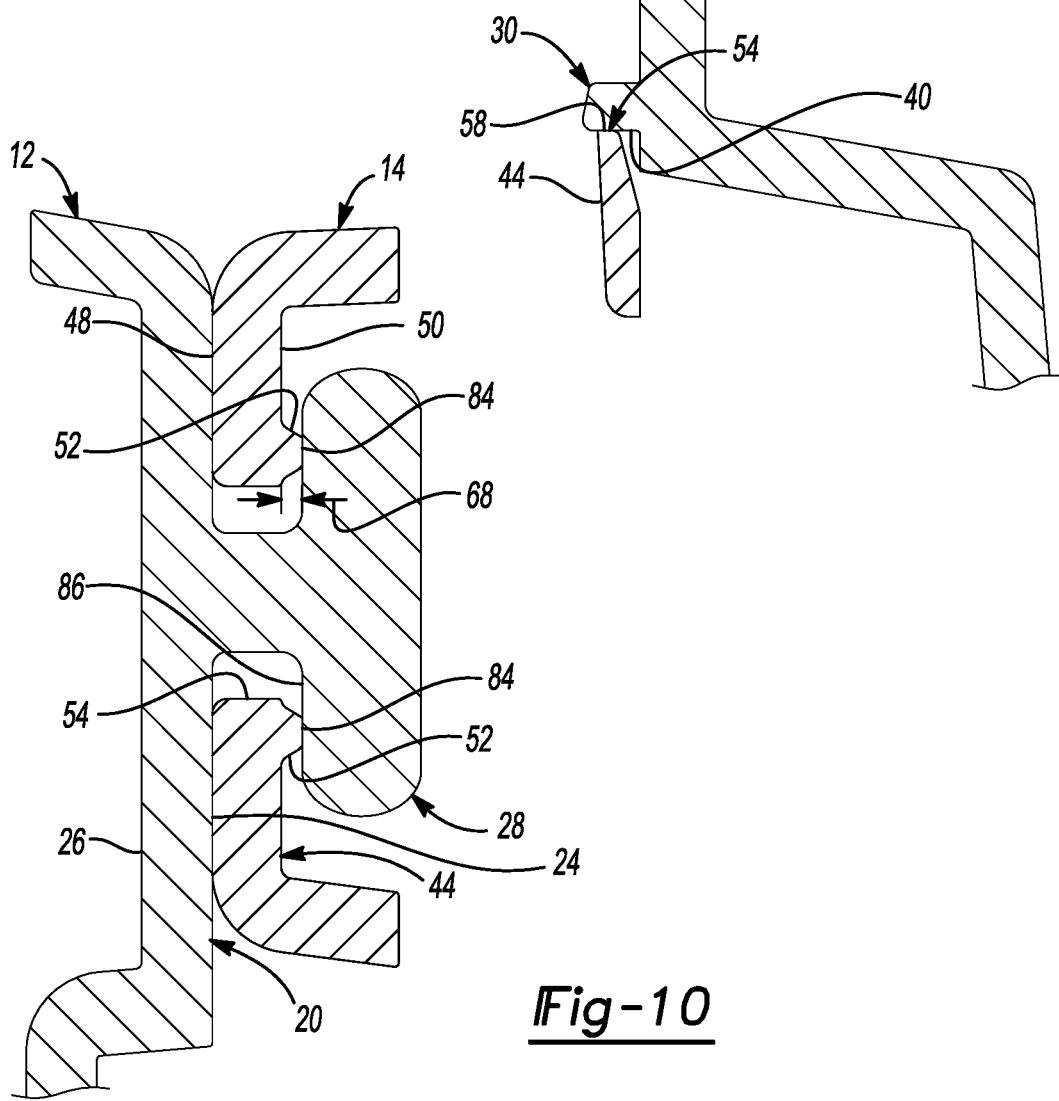

SYSTEM AND METHOD FOR FASTENING AND LOCATING ONE VEHICLE COMPONENT RELATIVE TO ANOTHER VEHICLE COMPONENT WITHOUT USING MECHANICAL FASTENERS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for fastening and locating one vehicle component relative to another vehicle component without using mechanical fasteners.

Vehicle interior trim panels are typically secured to vehicle body structure or to one another using mechanical fasteners, such as screws, bolts, nuts, or rivets. In some instances, it may be necessary to disassemble a vehicle interior trim panel after a vehicle is assembled. For example, it may be necessary to remove a service panel for a fuse block in order to change a fuse. In these instances, specialty tools for removing the mechanical fasteners are typically required to disassemble vehicle interior trim panels from vehicle body structure or from one another. The specialty tools increases the cost of servicing the vehicle, and removing the mechanical fasteners increases the amount of time required to service the vehicle.

SUMMARY

An example of a system according to the present disclosure includes a first vehicle component and a second vehicle component. The first vehicle component includes a first panel, a T-shaped projection protruding from a mating surface of the first panel, and a locking projection protruding from the mating surface of the first panel. The second vehicle component includes a second panel and a pair of ramped ribs projecting from a non-mating surface of the second panel. The second panel defines a slot that extends through the non-mating surface thereof. The slot includes a first portion having a first width and a second portion having a second width that is less than the first width. The ramped ribs are disposed on opposite sides of the second portion of the slot. The first vehicle component is configured to be fastened to the second vehicle component and located relative to the second vehicle component by positioning the first vehicle component to (i) insert the T-shaped projection on the first panel in a first direction through the first portion of the slot in the second panel, and (ii) move the T-shaped projection on the first panel in a second direction from the first portion of the slot in the second panel to the second portion of the slot and along the ramped ribs on the second panel until the locking projection on the first panel is positioned in the first portion of the slot.

In one aspect, when the T-shaped and locking projections on the first panel are positioned in the slot in the second panel, a mating surface of the second panel engages the mating surface of the first panel and the ramped ribs on the second panel engage the T-shaped projection on the first panel to secure the first vehicle component relative to the second vehicle component in the first direction.

In one aspect, the first and second portions of the slot in the second panel are disposed adjacent to first and second longitudinal ends of the slot, respectively, the T-shaped projection on the first panel has an underside surface that engages top surfaces of the ramped ribs on the second panel, and adjacent to the second longitudinal end of the slot, a distance between the underside surface of the T-shaped projection and the mating surface of the first panel is approximately equal to a distance between the top surfaces of the ramped ribs and the mating surface of the second panel.

In one aspect, when the T-shaped and locking projections on the first panel are positioned in the slot in the second panel, the locking projection engages a first longitudinal end of the slot and the T-shaped projection engages a second longitudinal end of the slot to secure the first vehicle component relative to the second vehicle component in the second direction.

In one aspect, the locking projection on the first panel has a first surface that engages the first longitudinal end of the slot in the second panel, the T-shaped projection on the first panel has a second surface that engages the first longitudinal end of the slot in the second panel, and a distance between the first and second surfaces is approximately equal to a distance between the first and second longitudinal ends.

In one aspect, the T-shaped projection on the first panel includes a stem and a crossbar, the stem projecting from the mating surface of the first panel, the crossbar being oriented perpendicular to the stem with the stem adjoining a midpoint of the crossbar along a length thereof.

In one aspect, the crossbar of the T-shaped projection has a length, the length of the crossbar is less than the first width of the first portion of the slot in the second panel, and the length of the crossbar is greater than the second width of the second portion of the slot in the second panel.

In one aspect, the locking projection on the first panel includes at least one ramped surface and a flat surface, the at least one ramped surface of the locking projection engages a mating surface of the second panel when the T-shaped projection on the first panel is inserted through the first portion of the slot in the second panel, and the flat surface of the locking projection engages a longitudinal end of the slot in the second panel when the locking projection is positioned in the first portion of the slot.

In one aspect, the first panel flexes away from the second panel when the locking projection of the first panel engages the mating surface of the second panel, and the first panel snaps the locking projection into the slot in the second panel when the locking projection is aligned with the slot.

In one aspect, the first and second vehicle components are vehicle trim components.

In one aspect, the first vehicle component is a service panel for a fuse block of a vehicle, and the second vehicle component is a glovebox frame of the vehicle.

In one aspect, the slot has a T shape with the first portion of the slot forming a cross member of the T shape and the second portion of the slot forming a stem of the T shape.

In one aspect, the first and second portions of the slot in the second panel are disposed adjacent to first and second longitudinal ends of the slot, respectively, and the ramped ribs on the second panel extend in the second direction from the first portion of the slot to the second longitudinal end of the slot.

In one aspect, the ramped ribs project from the non-mating surface of the second panel by an amount that increases in the second direction.

In one aspect, the first direction is perpendicular to the non-mating surface of the second panel, and the second direction is parallel to a length of the slot in the second panel.

Another example of a system according to the present disclosure includes a first vehicle component and a second vehicle component. The first vehicle component includes a first panel having a mating surface and a non-mating surface opposite of the mating surface, a T-shaped projection protruding from the mating surface of the first panel, and a locking projection protruding from the mating surface of the first panel. The T-shaped projection includes a stem and a crossbar oriented perpendicular to the stem. The second vehicle component includes a second panel having a mating surface and a non-mating surface opposite of the mating surface of the second panel, and a pair of ramped ribs projecting from the non-mating surface of the second panel. The second panel defines a T-shaped slot extending through the mating and non-mating surfaces of the second panel. The T-shaped slot has a first longitudinal end and a second longitudinal end opposite of the first longitudinal end. The T-shaped slot includes a first portion disposed adjacent to the first longitudinal end thereof and a second portion disposed adjacent to the second longitudinal end thereof. The first portion of the T-shaped slot has a first width and the second portion of the T-shaped slot having a second width that is less than the first width. The first vehicle component is configured to be fastened to the second vehicle component and located relative to the second vehicle component by positioning the first vehicle component to (i) insert the T-shaped projection on the first panel in a first direction through the first portion of the T-shaped slot in the second panel, and (ii) move the T-shaped projection on the first panel in a second direction from the first portion of the T-shaped slot in the second panel to the second portion of the T-shaped slot and along the ramped ribs on the second panel until the locking projection on the first panel is positioned in the first portion of the T-shaped slot.

In one aspect, when the T-shaped and locking projections on the first panel are positioned in the T-shaped slot in the second panel, the mating surface of the second panel engages the mating surface of the first panel and the ramped ribs on the second panel engage the T-shaped projection on the first panel to secure the first vehicle component relative to the second vehicle component in the first direction.

In one aspect, the T-shaped projection on the first panel has an underside surface that engages top surfaces of the ramped ribs on the second panel, the ramped ribs project from the non-mating surface of the second panel by an amount that increases in the second direction, and adjacent to the second longitudinal end of the T-shaped slot, a distance between the underside surface of the T-shaped projection and the mating surface of the first panel is approximately equal to a distance between the top surfaces of the ramped ribs and the mating surface of the second panel.

In one aspect, when the T-shaped and locking projections on the first panel are positioned in the T-shaped slot in the second panel, the locking projection engages the first longitudinal end of the T-shaped slot and the T-shaped projection engages the second longitudinal end of the T-shaped slot to secure the first vehicle component relative to the second vehicle component in the second direction.

In one aspect, the locking projection on the first panel has a first surface that engages the first longitudinal end of the T-shaped slot in the second panel, the T-shaped projection on the first panel has a second surface that engages the first longitudinal end of the T-shaped slot in the second panel, and a distance between the first and second surfaces is approximately equal to a distance between the first and second longitudinal ends.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 6 is a sectioned perspective view of the fuse service panel and the glovebox frame illustrating the initial load direction of the fuse service panel during assembly;

FIG. 7 is a sectioned perspective view of the fuse service panel and the glovebox frame illustrating the secondary load direction of the fuse service panel during assembly;

FIG. 9 is a section view illustrating engagement between the fuse service panel and the glovebox frame that secures the fuse service panel in the fore-aft direction of the vehicle; and FIG. 10 is a section view illustrating engagement between the fuse service panel and the glovebox frame that secures the fuse service panel in the side-to-side direction of the vehicle.

In the drawings, reference numbers may be reused to identify similar and/or identical elements.

DETAILED DESCRIPTION

Figure 1:
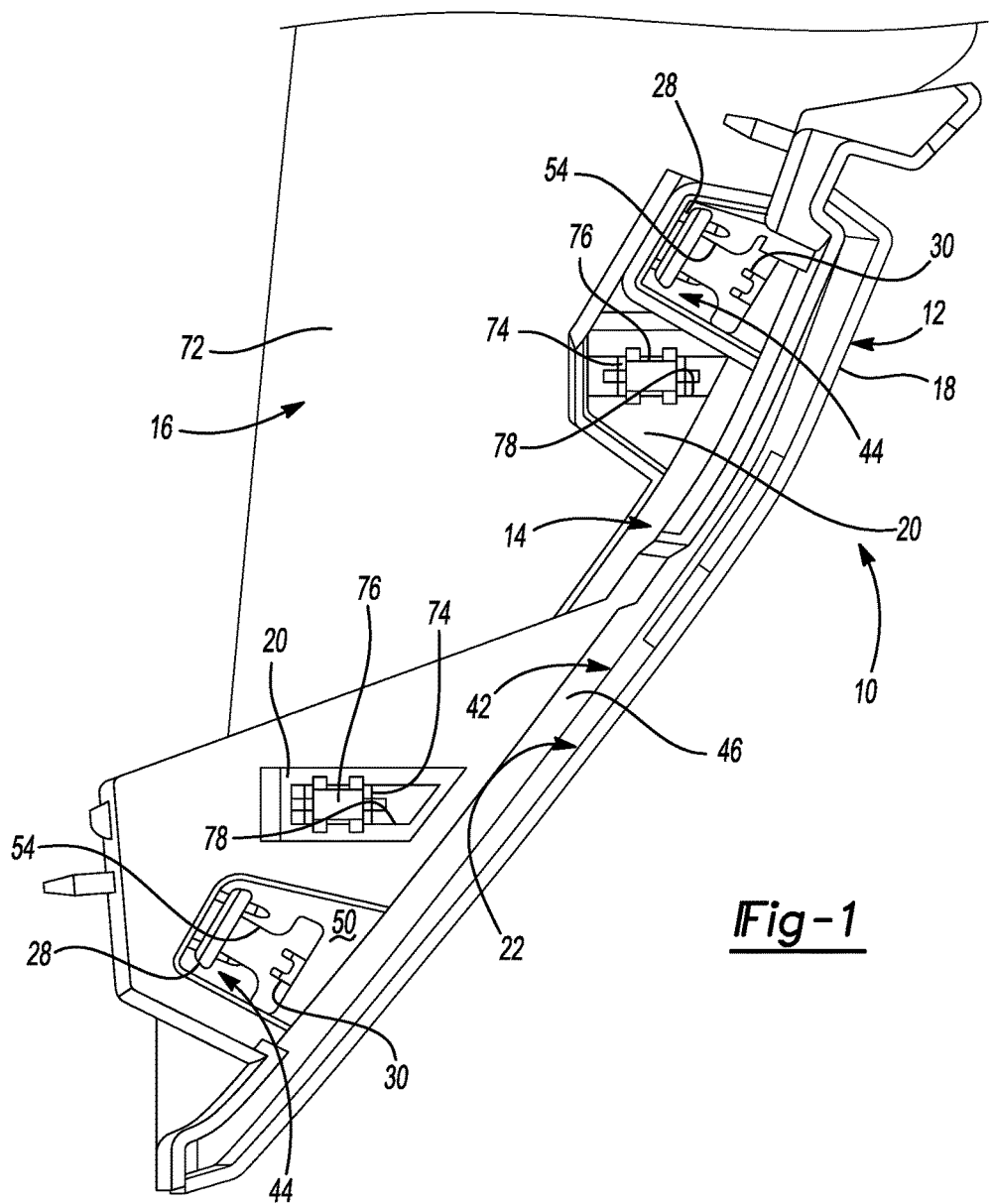
FIG. 1 is a side view of an instrument panel of a vehicle including an example of a system for fastening and locating a fuse service panel of the vehicle relative to a glovebox frame of the vehicle according to the present disclosure.

To reduce the cost and time associated with removing an interior trim panel from a vehicle, it may be desirable to fasten the interior trim panel to a body structure of the vehicle, or to another interior trim panel, without using mechanical fasteners. For example, the interior trim panel may be secured to the body structure using an interference or snap fit. However, interference or snap fits are typically formed when one component is installed onto another component in a single direction. Therefore, the components may be disassembled from one another by simply applying a force to the one component in an opposite direction than the install direction. In addition, the force required to disassemble the components from one another is typically low.

A system according to the present disclosure fastens one vehicle component to another vehicle component, and locates the one vehicle component relative to the other vehicle component, without using mechanical fasteners. In the examples described below, the one vehicle component is a service panel for a fuse box of a vehicle, and the other vehicle component is a glovebox frame. However, the system according to the present disclosure may be incorporated in other types of interior trim panels such as garnishes, overhead panels, consoles, and speaker coverings. In addition, the system according to the present disclosure may be incorporated into vehicle components other than interior trim panels such as underhood components.

In one example, the system includes a T-shaped projection protruding from the service panel and a locking projection protruding from the service panel. The system further includes a flange or panel of the glovebox frame, or a portion thereof, which defines a T-shaped slot, and a pair of ramped ribs disposed on opposite sides of a stem portion of the T-shaped slot. The T-shaped projection on the service panel is inserted in a first direction through a cross portion of the T-shaped slot in the glovebox frame, and then moved in a second direction into the stem portion of the T-shaped slot and along/up the ramped ribs. The T-shaped projection on the service panel is moved in the second direction until the locking projection on the service panel snaps into the T-shaped slot. At that point, the ramped ribs engage an underside surface of the T-shaped projection to secure the service panel in the first direction. In addition, longitudinal ends of the T-shaped slot engage the T-shaped and locking projections to secure the service panel in the second direction.

The system is integral with, or part of, the service panel and the glovebox frame. Thus, the system eliminates the need to use mechanical fasteners to join the service panel to the glovebox frame, which yields cost savings. In addition, the service panel can be removed without specialty tools, which improves the serviceability of the service panel and/or the fuse box covered by the service panel. Further, the system secures the service panel in two directions (e.g., side-to-side and fore-aft directions of a vehicle), which ensures that the service panel cannot be dislodged during normal vehicle use. For example, if the service panel is located in the vicinity of a knee airbag, the system ensures that the service panel cannot be dislodged when the knee airbag is deployed.

Referring now to FIGS. 1-5, an instrument panel 10 of a vehicle includes a service panel 12 for a fuse block (not shown) of the vehicle, a glovebox frame 14, and an end cap 16. The service panel 12 is configured to be fastened to the glovebox frame 14 and located relative to the glovebox frame 14 without using mechanical fasteners. The service panel 12 includes a main panel 18 and flanges or side panels 20 projecting from a backside 22 of the main panel 18. Each side panel 20 has a mating surface 24 configured to mate against the glovebox frame 14 and a non-mating surface 26 opposite of the mating surface 24.

The service panel 12 further includes T-shaped projections 28 protruding from the mating surfaces 24 of the side panels 20 and locking projections 30 protruding from the mating surfaces 24 of the side panels 20. The T-shaped and locking projections 28 and 30 are integral with, or part of, the side panels 20. In other words, the side panels 20 and the T-shaped and locking projections 28 and 30 are formed together as a unitary body. In one example, the entire service panel 12, including the side panel 20s and the T-shaped and locking projections 28 and 30, are formed (e.g., molded) from plastic as a unitary body in a single operation.

Each T-shaped projection 28 on the side panels 20 includes a stem 32 and a crossbar 34 that is oriented perpendicular to the stem 32. The stem 32 adjoins a midpoint of the crossbar 34 along a length 36 thereof. Each locking projection 30 on the side panels 20 includes ramped surfaces 38 and a flat surface 40.

The glovebox frame 14 includes a main panel 42 and tabs or side panels 44 projecting from a backside 46 of the main panel 42. Each side panel 44 has a mating surface 48 configured to mate against the mating surface 24 of the service panel 12 and a non-mating surface 50 opposite of the mating surface 48. The glovebox frame 14 further includes ramped ribs 52 projecting from the non-mating surfaces 50 of the side panels 44. The ramped ribs 52 are integral with, or part of, the side panels 44. In other words, the side panels 44 and the ramped ribs 52 are formed together as a unitary body. In one example, the entire glovebox frame 14, including the side panels 44 and the ramped ribs 52, are formed (e.g., molded) from plastic or metal as a unitary body in a single operation.

Each side panel 44 defines a T-shaped slot 54 extending through the mating and non-mating surfaces 48 and 50 thereof. Each T-shaped slot 54 has a forward end 56 and a rearward end 58. In addition, each T-shaped slot 54 includes a stem portion 60 disposed adjacent to the forward end 56 thereof and a cross portion 62 disposed adjacent to the rearward end 58 thereof. The cross portion 62 of each T-shaped slot 54 has a first width 64 (FIG. 2), and the stem portion 60 of each T-shaped slot 54 has a second width 66 (FIG. 4) that is less than the first width 64.

On each side panel 44, the ramped ribs 52 are disposed on opposite sides of the stem portion 60 of the T-shaped slot 54 and extend from the cross portion 62 of the T-shaped slot 54 to the forward end 56 of the T-shaped slot 54. The amount by which the ramped ribs 52 on each side panel 44 project from the non-mating surface 50 thereof is a height 68 (FIG. 10) of the ramped ribs 52. The height 68 of the ramped ribs 52 increases in a forward direction 70 (FIG. 7) of the vehicle.

The end cap 16 includes a main panel 72, brackets 74 projecting from the main panel 72, and flexible clips 76 that are secured to the brackets 74 using, for example, an interference fit. In one example, the main panel 72 and the brackets 74 are formed together as a unitary body from plastic, and the flexible clips 76 are formed separately from metal. The flexible clips 76 clip onto the brackets 74 and are configured to clip into slots 78 in the side panels 20 of the service panel 12.

Figure 2:
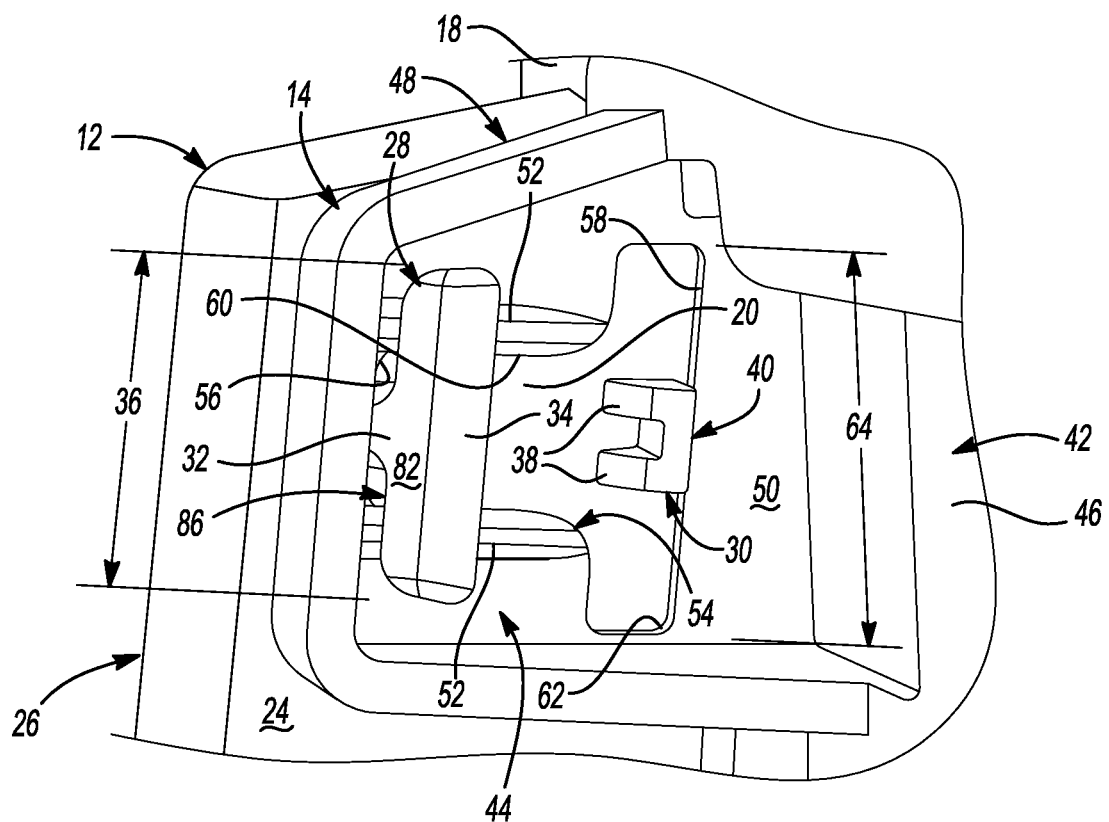
FIG. 2 is a perspective view of the system of FIG. 1.
Figure 3:
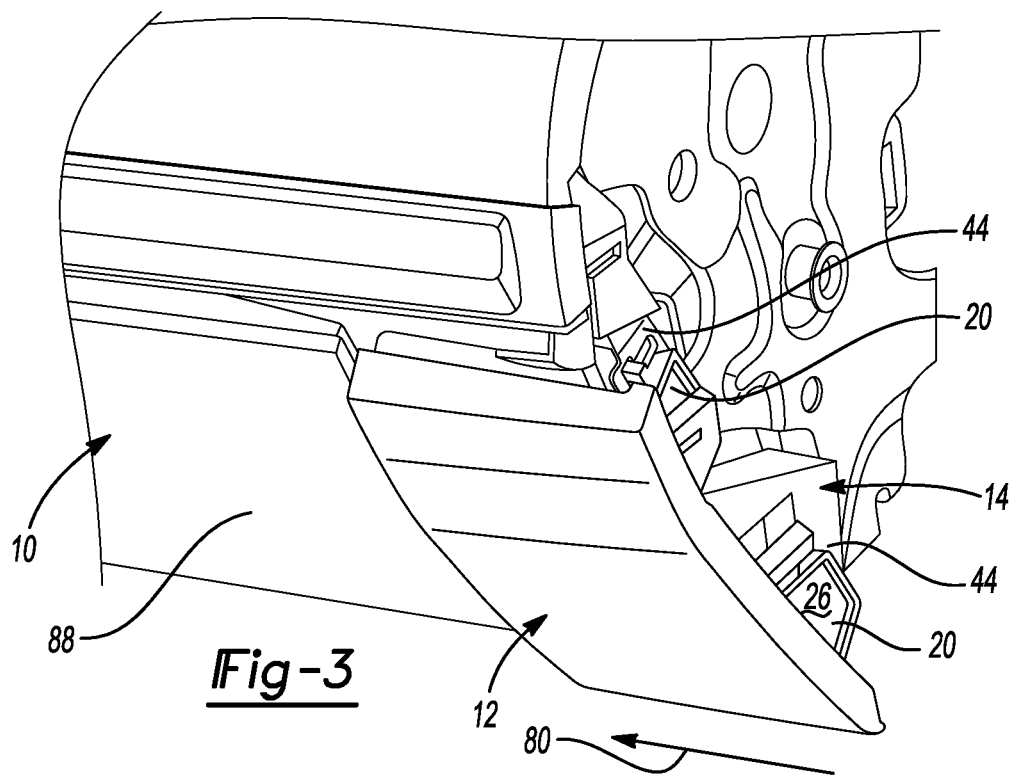
FIG. 3 is a front perspective view of the instrument panel of FIG. 1 illustrating a direction in which the fuse service panel is initially loaded onto the glovebox frame during assembly.
Figure 4:
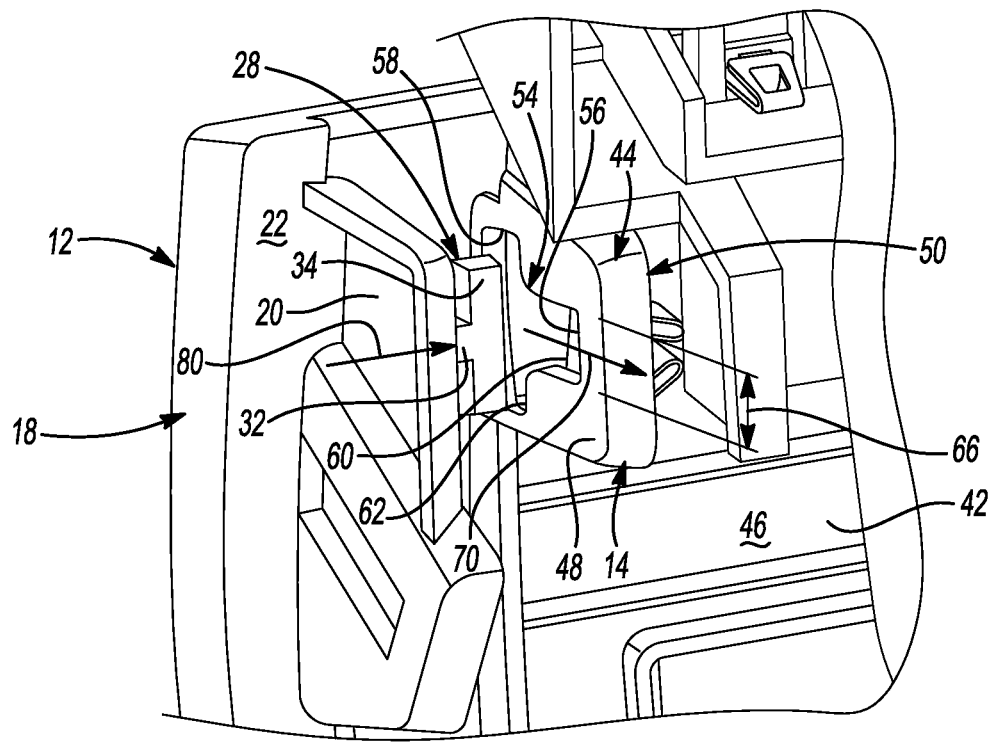
FIG. 4 is a rear perspective view of the instrument panel of FIG. 1 illustrating the initial load direction of the fuse service panel and a secondary load direction of the fuse service panel during assembly.

Referring now to FIGS. 2-8, a method for fastening the service panel 12 to the glovebox frame 14 and locating the service panel 12 relative to the glovebox frame 14 without using mechanical fasteners will now be described. First, the service panel 12 is positioned to insert each T-shaped projection 28 on the service panel 12 through the cross portion 62 of a corresponding one of the T-shaped slots 54 in the glovebox frame 14, as shown in FIGS. 3 and 4. Each T-shaped projection 28 is then inserted in a lateral (i.e., left or right) direction 80 of the vehicle through the cross-portion 62 of the T-shaped slot 54 as shown in FIG. 6. The lateral direction 80 is perpendicular to the mating and non-mating surfaces 48 and 50 of the glovebox frame 14. The length 36 of the crossbar 34 on the T-shaped projection 28 is less than the first width 64 of the cross portion 62 of the T-shaped slot 54 so that the T-shaped projection 28 may be inserted into the cross-portion 62 of the T-shaped slot 54.

Figure 5:
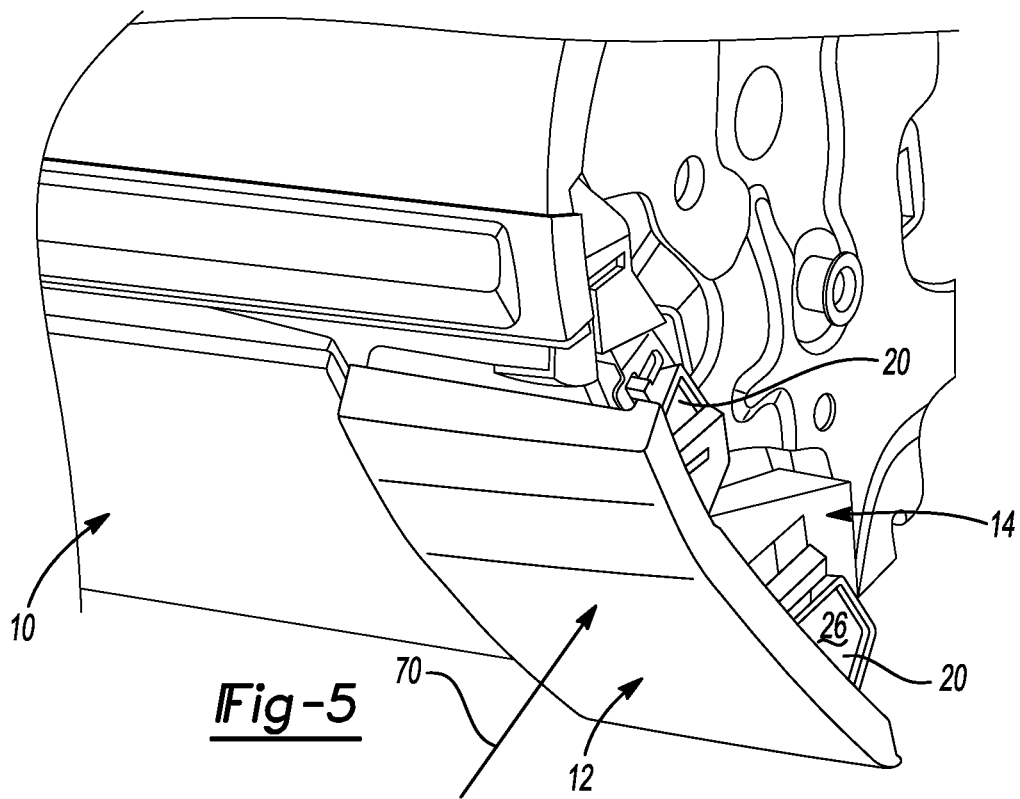
FIG. 5 is a front perspective view of the instrument panel of FIG. 1 illustrating the secondary load direction of the fuse service panel during assembly.

The service panel 12 is then positioned to move each T-shaped projection 28 on the service panel 12 in the forward direction 70 within the t-shaped slot 54 from the cross portion 62 thereof to the stem portion 60 thereof, as shown in FIGS. 5 and 7. The forward direction 70 is parallel to a length of the T-shaped slot 54 (i.e., a dimension of the T-shaped slot 54 extending between the forward and rearward ends 56 and 58 thereof). The length 36 of the crossbar 34 of the T-shaped projection 28 is greater than the second width 66 of the stem portion 60 of the T-shaped slot 54 so that the crossbar 34 is captured in the T-shaped slot 54 when the T-shaped projection 28 is moved into the stem portion 60 of the T-shaped slot 54. As each T-shaped projection 28 is moved in the forward direction 70 within the T-shaped slot 54, the locking projection 30 engages the mating surface 48 of the glovebox panel 14. This engagement causes a portion of the service panel 12 around the locking projection 30 to flex away from the mating surface 48 of the glovebox panel 14. Each T-shaped projection 28 is moved in the forward direction 70 up and along the ramped ribs 52 on the glovebox panel 14 until the locking projection 30 is aligned with the T-shaped slot 54. At that time, the flexed portion of the service panel 12 relaxes and snaps the locking projection 30 into the cross portion 62 of the T-shaped slot 54 as shown in FIGS. 2 and 8.

Figure 8:
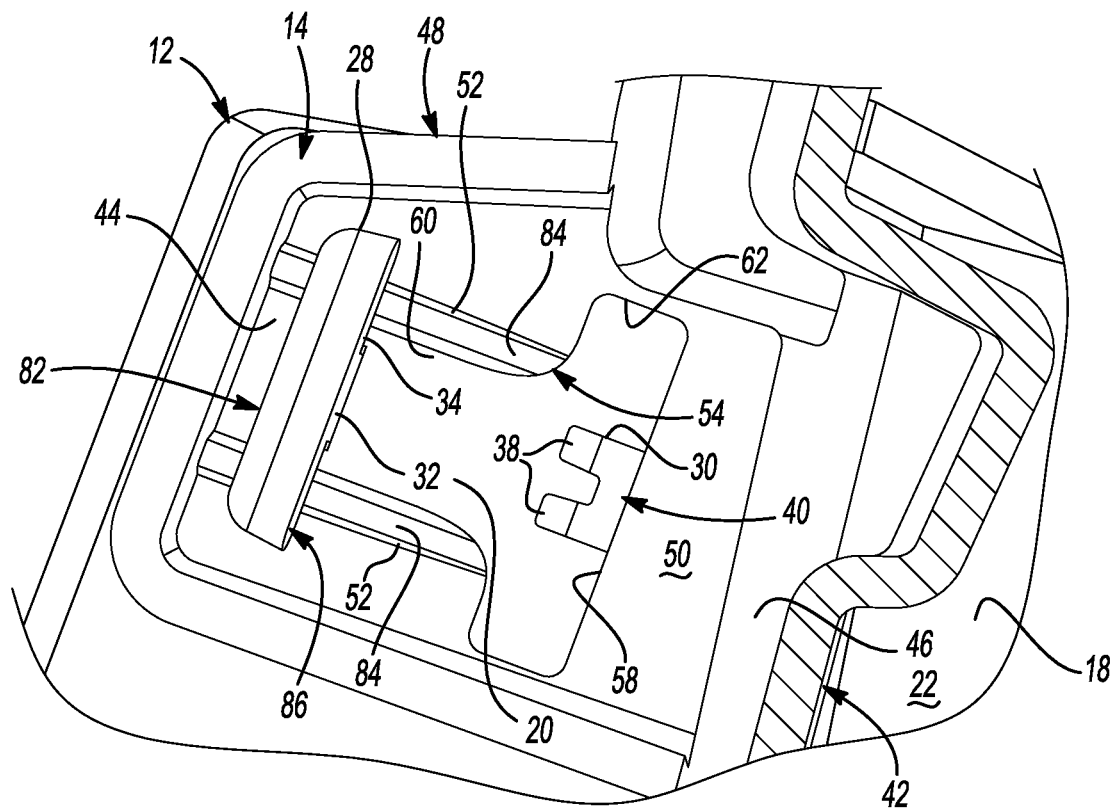
FIG. 8 is a side view of the fuse service panel and the glovebox frame after the fuse service panel is fully assembled to the glovebox frame and secured to the glovebox frame in fore-aft and side-to-side directions of the vehicle.

When the T-shaped and locking projections 28 and 30 on the service panel 12 are positioned in the T-shaped slot 54 in the glovebox frame 14 as shown in FIGS. 2 and 8, the forward end 56 of the T-shaped slot 54 engages a forward surface 82 on the T-shaped projection 28. In addition, the rearward end 58 of the T-shaped slot 54 engages the flat surface 40 on the locking projection 30. This engagement between the T-shaped slot 54 and the T-shaped projection 28 and between the T-shaped slot 54 and the locking projection 30 secures the service panel 12 in a fore-aft direction of the vehicle (i.e., in the forward direction 70 of the vehicle and a rearward direction of the vehicle opposite of the forward direction 70).

Also, when the T-shaped and locking projections 28 and 30 on the service panel 12 are positioned in the T-shaped slot 54 in the glovebox frame 14, the mating surface 48 of the glovebox panel 14 engages the mating surface 24 of the service panel 12. In addition, top surfaces 84 of the ramped ribs 52 on the glovebox panel 14 engages an underside surface 86 of the T-shaped projection 28 on the service panel 12. This engagement between the mating surfaces 24, 48 and between the ramped ribs 52 and the T-shaped projection 28 secures the service panel 12 in a side-to-side direction (i.e., in the left and right directions) of the vehicle.

Once the service panel 12 is fastened to the glovebox frame 14 and located relative to the glovebox frame 14 as discussed above, the end cap 16 is assembled to the service panel 12 as shown in FIG. 1. The flexible clips 76 are preassembled to the brackets 74 of the end cap 16 before the end cap 16 is assembled to the service panel 12. To assemble the end cap 16 to the service panel 12, the flexible clips 76 are inserted into the slots 78 in the side panels 20 of the service panel 12. The end cap 16 encapsulates the service panel 12 and fully locks the service panel 12 into position. Although the service panel 12 is securely fastened to the glovebox frame 14 before the end cap 16 is installed, the end cap 16 serves as an additional measure to ensure that the service panel 12 cannot be dislodged during normal vehicle use. For example, briefly referring to FIG. 3, a knee airbag may be located within a compartment 88 of the instrument panel 10, and the end cap 16 ensures that the service panel 12 when the knee airbag is deployed.

Referring now to FIG. 9, the tightness of the fit between the service panel 12 and the glovebox frame 14 in the fore-aft direction of the vehicle may be adjusted by adjusting the location of surfaces on these two components relative to one another. As discussed above, the service panel 12 is secured in the fore-aft direction via the engagement between the forward end 56 of the T-shaped slot 54 and the forward surface 82 on the T-shaped projection 28 and between the rearward end 58 of the T-shaped slot 54 and the flat surface 40 on the locking projection 30. Thus, the tightness of the fit between the service panel 12 and the glovebox frame 14 in the fore-aft direction may be adjusted by adjusting the distance between the forward and rearward ends 56 and 58 of the T-shaped slot 54. In addition, the tightness of the fit between the service panel 12 and the glovebox frame 14 in the fore-aft direction may be adjusted by adjusting the distance between the forward surface 82 on the T-shaped projection 28 and the flat surface 40 of the locking projection 30.

In the example shown, the distance between the forward and rearward ends 56 and 58 of the T-shaped slot 54 is approximately equal to (e.g., within 1 mm of) the distance between the forward surface 82 on the T-shaped projection 28 and the flat surface 40 on the locking projection 30. Thus, when the T-shaped and locking projections 28 and 30 on the service panel 12 are positioned in the T-shaped slot 54 in the glovebox frame 14 as shown, there is a snug fit between the service panel 12 and the glovebox frame 14 in the fore-aft direction. In some examples, the distance between the forward and rearward ends 56 and 58 of the T-shaped slot 54 is slightly (e.g., 2 mm) less than the distance between the forward surface 82 on the T-shaped projection 28 and the flat surface 40 on the locking projection 30. In these examples, there is an interference fit between the service panel 12 and the glovebox frame 14 in the fore-aft direction.

Referring now to FIG. 10, the tightness of the fit between the service panel 12 and the glovebox frame 14 in the side-to-side direction of the vehicle may be also adjusted by adjusting the location of surfaces on these two components relative to one another. As discussed above, the service panel 12 is secured in the side-to-side direction via the engagement between the mating surface 48 of the glovebox frame 14 engages the mating surface 24 of the service panel 12 and between the top surfaces 84 of the ramped ribs 52 on the glovebox frame 14 and the underside surface 86 of the T-shaped projection 28 on the service panel 12. Thus, the tightness of the fit between the service panel 12 and the glovebox frame 14 in the side-to-side direction may be adjusted by adjusting the distance between the mating surface 48 on the glovebox frame 14 and the top surfaces 84 on the ramped ribs 52. In addition, the tightness of the fit between the service panel 12 and the glovebox frame 14 in the side-to-side direction may be adjusted by adjusting the distance between the mating surface 24 of the service panel 12 and the underside surface 86 of the T-shaped projection 28 on the service panel 12.

In the example shown, adjacent to the forward end 56 of the T-shaped slot 54, the distance between the mating surface 48 on the glovebox frame 14 and the top surfaces 84 on the ramped ribs 52 is approximately equal to the distance between the mating surface 24 of the service panel 12 and the underside surface 86 of the T-shaped projection 28 on the service panel 12. Thus, when the T-shaped and locking projections 28 and 30 on the service panel 12 are positioned in the T-shaped slot 54 in the glovebox frame 14 as shown, there is a snug fit between the service panel 12 and the glovebox frame 14 in the side-to-side direction. In some examples, the distance between the mating surface 48 on the glovebox frame 14 and the top surfaces 84 on the ramped ribs 52 is slightly less than the distance between the mating surface 24 of the service panel 12 and the underside surface 86 of the T-shaped projection 28 on the service panel 12. In these examples, there is an interference fit between the service panel 12 and the glovebox frame 14 in the fore-aft direction.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A system comprising:
    a first vehicle component including a first panel, a T-shaped projection protruding from a mating surface of the first panel, and a locking projection protruding from the mating surface of the first panel; and
    a second vehicle component including a second panel and a pair of ramped ribs projecting from a non-mating surface of the second panel, the second panel defining a slot that extends through the non-mating surface thereof, the slot including a first portion having a first width and a second portion having a second width that is less than the first width, the ramped ribs being disposed on opposite sides of the second portion of the slot, wherein the first vehicle component is configured to be fastened to the second vehicle component and located relative to the second vehicle component by positioning the first vehicle component to:
        insert the T-shaped projection on the first panel in a first direction through the first portion of the slot in the second panel; and
        move the T-shaped projection on the first panel in a second direction from the first portion of the slot in the second panel to the second portion of the slot and along the ramped ribs on the second panel until the locking projection on the first panel is positioned in the first portion of the slot.

2. The system of claim 1 wherein when the T-shaped and locking projections on the first panel are positioned in the slot in the second panel, a mating surface of the second panel engages the mating surface of the first panel and the ramped ribs on the second panel engage the T-shaped projection on the first panel to secure the first vehicle component relative to the second vehicle component in the first direction.

3. The system of claim 2 wherein:
    the first and second portions of the slot in the second panel are disposed adjacent to first and second longitudinal ends of the slot, respectively;
    the T-shaped projection on the first panel has an underside surface that engages top surfaces of the ramped ribs on the second panel; and
    adjacent to the second longitudinal end of the slot, a distance between the underside surface of the T-shaped projection and the mating surface of the first panel is approximately equal to a distance between the top surfaces of the ramped ribs and the mating surface of the second panel.

4. The system of claim 1 wherein when the T-shaped and locking projections on the first panel are positioned in the slot in the second panel, the locking projection engages a first longitudinal end of the slot and the T-shaped projection engages a second longitudinal end of the slot to secure the first vehicle component relative to the second vehicle component in the second direction.

5. The system of claim 4 wherein:
    the locking projection on the first panel has a first surface that engages the first longitudinal end of the slot in the second panel;
    the T-shaped projection on the first panel has a second surface that engages the first longitudinal end of the slot in the second panel; and
    a distance between the first and second surfaces is approximately equal to a distance between the first and second longitudinal ends.

6. The system of claim 1 wherein the T-shaped projection on the first panel includes a stem and a crossbar, the stem projecting from the mating surface of the first panel, the crossbar being oriented perpendicular to the stem with the stem adjoining a midpoint of the crossbar along a length thereof.

7. The system of claim 6 wherein:
    the crossbar of the T-shaped projection has a length;
    the length of the crossbar is less than the first width of the first portion of the slot in the second panel; and
    the length of the crossbar is greater than the second width of the second portion of the slot in the second panel.

8. The system of claim 1 wherein:
    the locking projection on the first panel includes at least one ramped surface and a flat surface;
    the at least one ramped surface of the locking projection engages a mating surface of the second panel when the T-shaped projection on the first panel is inserted through the first portion of the slot in the second panel; and the flat surface of the locking projection engages a longitudinal end of the slot in the second panel when the locking projection is positioned in the first portion of the slot.

9. The system of claim 8 wherein the first panel flexes away from the second panel when the locking projection of the first panel engages the mating surface of the second panel, and the first panel snaps the locking projection into the slot in the second panel when the locking projection is aligned with the slot.

10. The system of claim 1 wherein the first and second vehicle components are vehicle trim components.

11. The system of claim 10 wherein the first vehicle component is a service panel for a fuse block of a vehicle, and the second vehicle component is a glovebox frame of the vehicle.

12. The system of claim 1 wherein the slot has a T shape with the first portion of the slot forming a cross member of the T shape and the second portion of the slot forming a stem of the T shape.

13. The system of claim 1 wherein:
the first and second portions of the slot in the second panel are disposed adjacent to first and second longitudinal ends of the slot, respectively; and
the ramped ribs on the second panel extend in the second direction from the first portion of the slot to the second longitudinal end of the slot.

14. The system of claim 1 wherein the ramped ribs project from the non-mating surface of the second panel by an amount that increases in the second direction.

15. The system of claim 1 wherein:
the first direction is perpendicular to the non-mating surface of the second panel; and
the second direction is parallel to a length of the slot in the second panel.

16. A system comprising:
a first vehicle component including a first panel having a mating surface and a non-mating surface opposite of the mating surface, a T-shaped projection protruding from the mating surface of the first panel, and a locking projection protruding from the mating surface of the first panel, the T-shaped projection including a stem and a crossbar oriented perpendicular to the stem; and
a second vehicle component including a second panel having a mating surface and a non-mating surface opposite of the mating surface of the second panel, and a pair of ramped ribs projecting from the non-mating surface of the second panel, the second panel defining a T-shaped slot extending through the mating and non-mating surfaces of the second panel, the T-shaped slot having a first longitudinal end and a second longitudinal end opposite of the first longitudinal end, the T-shaped slot including a first portion disposed adjacent to the first longitudinal end thereof and a second portion disposed adjacent to the second longitudinal end thereof, the first portion of the T-shaped slot having a first width and the second portion of the T-shaped slot having a second width that is less than the first width, wherein the first vehicle component is configured to be fastened to the second vehicle component and located relative to the second vehicle component by positioning the first vehicle component to:
insert the T-shaped projection on the first panel in a first direction through the first portion of the T-shaped slot in the second panel; and
move the T-shaped projection on the first panel in a second direction from the first portion of the T-shaped slot in the second panel to the second portion of the T-shaped slot and along the ramped ribs on the second panel until the locking projection on the first panel is positioned in the first portion of the T-shaped slot.

17. The system of claim 16 wherein when the T-shaped and locking projections on the first panel are positioned in the T-shaped slot in the second panel, the mating surface of the second panel engages the mating surface of the first panel and the ramped ribs on the second panel engage the T-shaped projection on the first panel to secure the first vehicle component relative to the second vehicle component in the first direction.

18. The system of claim 17 wherein:
the T-shaped projection on the first panel has an underside surface that engages top surfaces of the ramped ribs on the second panel;
the ramped ribs project from the non-mating surface of the second panel by an amount that increases in the second direction; and
adjacent to the second longitudinal end of the T-shaped slot, a distance between the underside surface of the T-shaped projection and the mating surface of the first panel is approximately equal to a distance between the top surfaces of the ramped ribs and the mating surface of the second panel.

19. The system of claim 16 wherein when the T-shaped and locking projections on the first panel are positioned in the T-shaped slot in the second panel, the locking projection engages the first longitudinal end of the T-shaped slot and the T-shaped projection engages the second longitudinal end of the T-shaped slot to secure the first vehicle component relative to the second vehicle component in the second direction.

20. The system of claim 19 wherein:
the locking projection on the first panel has a first surface that engages the first longitudinal end of the T-shaped slot in the second panel;
the T-shaped projection on the first panel has a second surface that engages the first longitudinal end of the T-shaped slot in the second panel; and
a distance between the first and second surfaces is approximately equal to a distance between the first and second longitudinal ends.

* * * * *